(12) United States Patent
Telimaa et al.

(10) Patent No.: US 7,648,679 B2
(45) Date of Patent: Jan. 19, 2010

(54) ELECTRIC PIPETTE

(75) Inventors: Juha Telimaa, Järvenpää (FI); Mikael Lind, Helsinki (FI); Vesa Salo, Rajamäki (FI); Mauno Heinonen, Vantaa (FI)

(73) Assignee: Thermo Fisher Scientific Oy, Vantaa (FI)

( * ) Notice: Subject to any disclaimer, the term of this patent is extended or adjusted under 35 U.S.C. 154(b) by 322 days.

(21) Appl. No.: 10/579,835

(22) PCT Filed: Nov. 12, 2004

(86) PCT No.: PCT/FI2004/000675

§ 371 (c)(1),
(2), (4) Date: Jun. 8, 2006

(87) PCT Pub. No.: WO2005/049208

PCT Pub. Date: Jun. 2, 2005

(65) Prior Publication Data

US 2008/0206109 A1  Aug. 28, 2008

(30) Foreign Application Priority Data

Nov. 19, 2003  (FI) .................................. 20031681

(51) Int. Cl.
*B01L 3/02* (2006.01)
(52) U.S. Cl. .................. 422/100; 73/864.11; 73/863.32; 73/864; 73/864.01; 73/864.02; 73/864.16; 73/864.18; 73/1.74

(58) Field of Classification Search .................. 422/100; 73/864.11, 864.13, 864.14, 864.18, 1.74, 73/863.32, 864, 864.01, 864.02, 864.16
See application file for complete search history.

(56) References Cited

U.S. PATENT DOCUMENTS

| 4,909,991 | A | * | 3/1990 | Oshikubo | .................. 422/100 |
| 4,988,481 | A | * | 1/1991 | Jarvimaki et al. | ........... 422/100 |
| 5,892,161 | A | | 4/1999 | Conley et al. | |
| 6,299,841 | B1 | | 10/2001 | Rainin et al. | |
| 2002/0012613 | A1 | * | 1/2002 | Scordato et al. | ............. 422/100 |
| 2003/0159526 | A1 | | 8/2003 | Viot | |

FOREIGN PATENT DOCUMENTS

| DE | 199 17 907 A1 | 11/2000 |
| FI | 84144 | 7/1991 |
| WO | WO 02/00346 A2 | 1/2002 |

* cited by examiner

*Primary Examiner*—Lyle A Alexander
*Assistant Examiner*—Dwan A Gerido
(74) *Attorney, Agent, or Firm*—Nixon & Vanderhye P.C.

(57) ABSTRACT

The invention relates to an electric pipette (1) comprising a body (2), a tip part (4), a hook part (5), a push-button part (6) and a display part (7), said body (1) having a vertical axis (3) and at least one of the parts selected from the group consisting of the hook part (5), the push-button part (6) and the display part (7) is rotatable about the vertical axis (3) of the electric pipette (1) correspondingly by an angle $\phi_1$, $\phi_2$ or $\phi_3$.

16 Claims, 3 Drawing Sheets

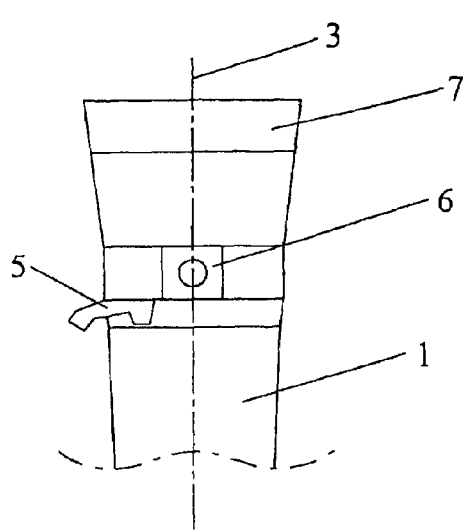
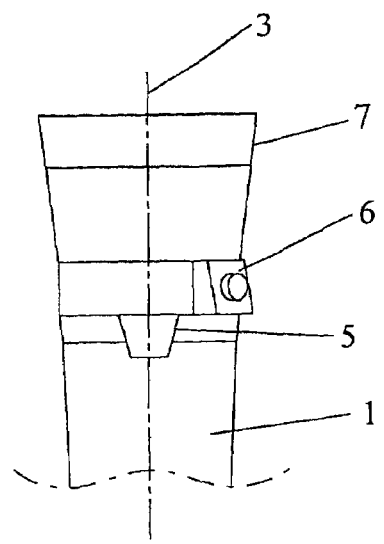
Fig. 3a
Fig. 3b
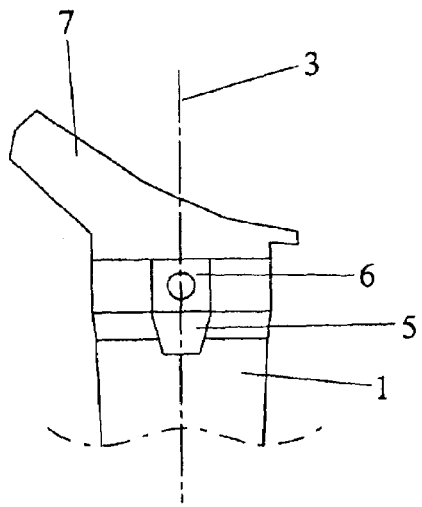
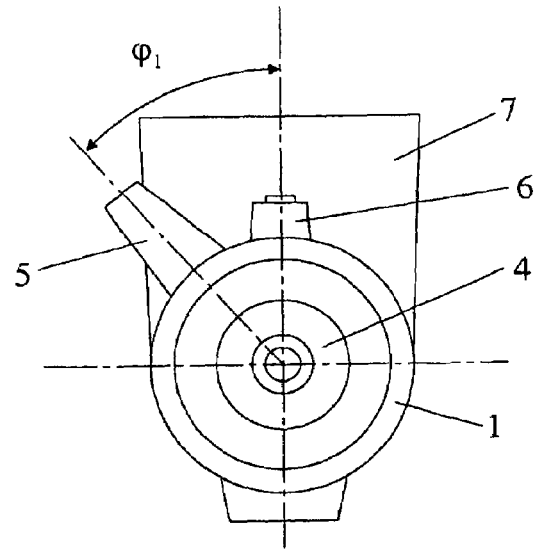
Fig. 3c
Fig. 4

ELECTRIC PIPETTE

This application is the US national phase of international application PCT/FI2004/000675 filed 12 Nov. 2004 which designated the U.S. and claims benefit of FI 20031681, dated 19 Nov. 2003, the entire content of which is hereby incorporated by reference.

FIELD OF THE INVENTION

The invention relates to an electric pipette. More specifically, the invention relates to improved ergonomics of an electric pipette.

STATE OF THE ART

Pipettes are used for dosing various liquids from one vessel to another. The liquid is absorbed through an opening in the tip part of the pipette into the pipette by means of a cylindrical piston by driving the piston upwardly so that the tip container of the pipette is filled. Accordingly, by driving the piston downwardly, the tip container will be emptied. The pipette (piston) can be manually or electrically operated. A laboratory worker frequently performs dosing operations repeatedly in succession, which may result in strain injuries in his/her hand. This imposes stringent requirements on the manipulation ergonomics of the pipette. There have been efforts to improve the ergonomics of pipettes by means of the design of the handle, among other things.

A number of references disclose such solutions aiming at resolving problems related to ergonomics by means of the design. In addition to these references, WO 02/00346 A2 discloses a hand-held pipette of pistol model comprising a rotating hook for improved ergonomics. In the pipette of this reference, the hook is supported on the area between the user's thumb and index while the tip of the pipette points in the opposite direction. The pipette is of pistol model, which does not comprise any actual hook supporting the pipette on the index from the opposite direction viewed from the user's direction. By shifting the position of the hook, the user may shift the point of support of the pipette in the area between his/her thumb and index as he/she wishes.

Conventional prior art electric pipettes comprise a hook part intended to provide enhanced support of the pipette on the user's hand during the use of the pipette. The hook is normally supported on the index or the middle finger, directing forwardly viewed from the user's direction. In addition to the hook part, an electric pipette comprises a display part for monitoring the dosage of liquid quantities, among other things, and a push-button part for driving the cylindrical piston into the desired direction.

CHARACTERISTICS OF THE INVENTION

The purpose of this invention is to further improve the comfort of use of electric pipettes and to thus prevent any strain injuries caused by their use.

To achieve this, the electric pipette of the invention is characterized by the electric pipette comprising a rotating hook part, a push-button part, a display part, or any combination of the rotating components mentioned above. The hook part is supported either on the user's index or middle finger, pointing substantially forwardly viewed from the user's direction, with the purpose to stabilize the pipette during use. Since the hook part is rotatable, it can be fitted in the most comfortable position on the finger from the user's point of view, resulting in enhanced comfort of use. The push-button is used for driving the cylindrical piston by means of an electric motor and for absorbing liquid into the tip container of the pipette or for discharging liquid from the tip container. The rotation feature of the push-button part allows positioning of the push-button at the ergonomically optimal location in the pipette. The display part simultaneously allows monitoring of the liquid amount in the tip container. The rotation feature of the display part allows the display to be continually visible during use without requiring the pipette to be turned in the user's hand.

The pipette of the invention allows appreciable improvements in the ergonomics of pipettes and reduction of strain injuries, and also adaptation of the same electric pipette to the preferences of several users.

The preferred embodiment of the invention is characterized by the features defined in the dependent claims below.

BRIEF DESCRIPTION OF THE DRAWINGS

The invention is explained in greater detail below by means of an example and with reference to the accompanying drawings, in which FIGS. 3a-3c show partial lateral views of an electric pipette, with the positions of the hook, push button and display of the electric pipette shifted alternately, and FIG. 4 shows the case of FIG. 3a viewed from below.

MORE SPECIFIC DESCRIPTION OF THE PIPETTES ILLUSTRATED IN THE DRAWINGS

Figure 1:
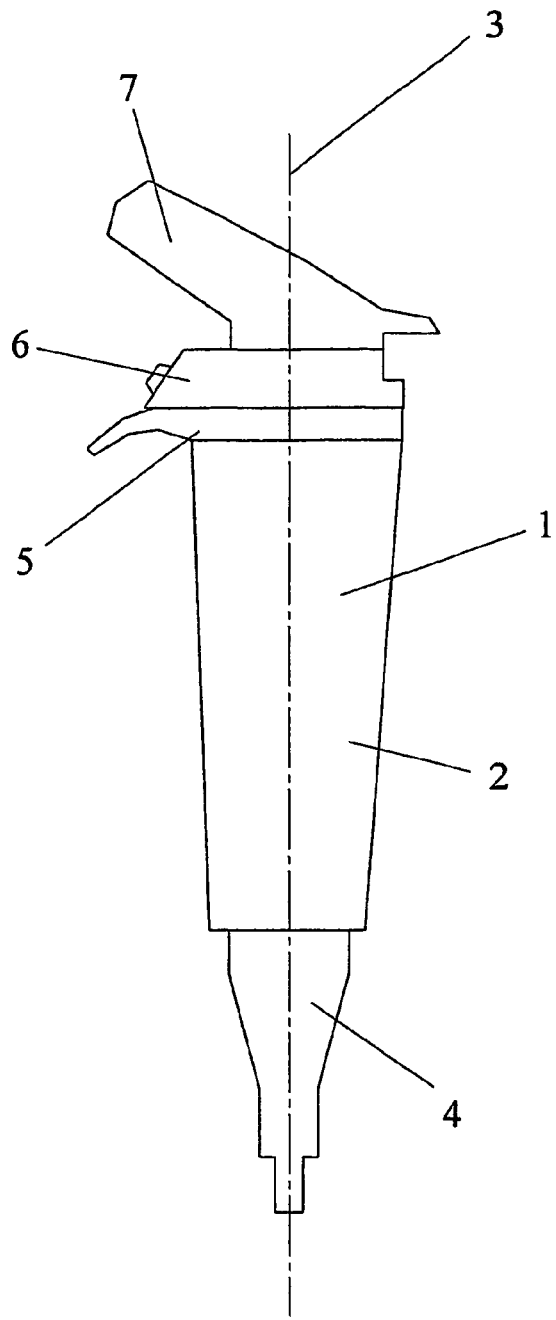
FIG. 1 shows an electric pipette of the invention viewed straight from the side.

FIG. 1 is a lateral view of the electric pipette 1. The electric pipette 1 consists of a body 2 having a vertical axis 3, a tip part 4, a hook part 5, a push-button part 6 and a display part 7. During use, the push-button part 6 is operated by the user's index and the hook part is supported on his/her middle finger. The hooks part 5 has the purpose of stabilizing and supporting the electric pipette 1 during use. This is of paramount importance in the case of a multi-channel pipette, which is heavier to manipulate. By pushing the push button 6, the user actuates the cylindrical piston by means of an electric motor and controls the liquid amount in the tip container, the same liquid amount being simultaneously monitored on the display part 7.

Figure 2:
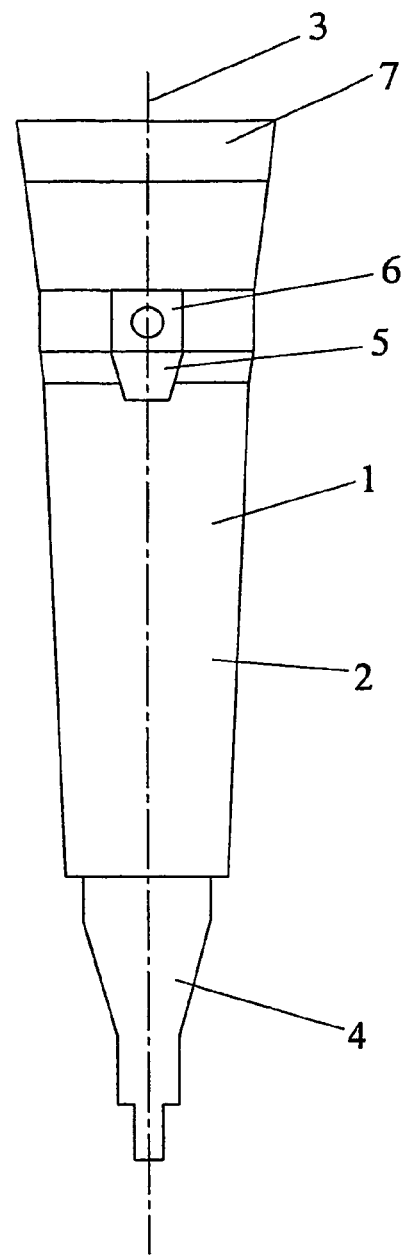
FIG. 2 shows the electric pipette of FIG. 1 viewed straight from the front.

FIG. 2 shows the electric pipette 1 of FIG. 1 viewed straight from the front. The expression "straight from the front" means the direction to which the hook part 5 and the push-button part 6 point in a conventional electric pipette, in which parts 5, 6 and 7 form a stationary unit together with the body 2.

FIG. 3a shows a partial lateral view of an electric pipette 1 viewed straight from the front, with the position of the hook part 5 rotated around the vertical axis 3. The push-button part 6 and the display part 7 remain in position. Rotation of the hook part 5 about the vertical axis of the electric pipette 1 is allowed by the annular shape of the hook part and by slide surfaces provided on both the hook part and the pipette body 2, rotation of the hook part being possible owing to these features.

FIG. 3b corresponding to FIG. 3a shows how the push-button part 6 is shifted about the vertical axis 3, while the hook part 5 and the display part 7 remain in position. In this case, the push-button part 6 has been shifted in the opposite direction relative to the direction of the hook part 5 in the preceding example. This will form a negative angle. Rotation of the push-button part 6 about the vertical axis 3 has been provided on the same principle as rotation of the hook part. Moreover, an electric contact surface has been provided on the slide surfaces in order to allow powering of the electric motor driving the piston in any position of the push-button part.

Corresponding to FIGS. 3*a* and 3*b*, FIG. 3*c* shows how the display part 7 is shifted about the vertical axis 3 while the hook part 5 and the push-button part 7 remain stationary. Rotation of the display part 7 and operation of the electrically driven display in different positions of the display part have been provided in the same manner as in the case of the push-button part 6 above.

FIG. 4 shows, viewed from below, how the hook part 5 of the electric pipette 1 has been shifted as in FIG. 3*a* by an angle $\phi_1$ so as to deviate from a position directed straight forwardly. The display part 7 and the push-button part 6 point straight forwardly. Similarly, the hook part 5 can be deviated into the other direction as well. The push button part 6 can be accordingly deviated over an angle $\phi_2$ and the display part 7 over an angle $\phi_3$. These parts 6 and 7 can also be deviated into the opposite direction. Rotation of these three parts 5, 6 and 7 allows adaptation of the electric pipette 1 to both left-handers and right-handers. In addition, they serve to influence the balance of the electric pipette 1, a crucial feature in the case of heavy multi-channel pipettes.

All of the rotatable parts 5, 6 and 7 can be disposed so as to be 360° rotatable, i.e. into any position relative to the pipette body 2. For convenient use, the angles $\phi_1$-$\phi_3$ can be restricted to the range −90-90°, preferably −70-70°, and very advantageously to the range −50-50°. The electric pipette 1 can be carried out with only one of the three potential rotatable parts 5, 6 and 7 rotatable about the vertical axis 3. It can also be carried out with two of the three potential parts or all three parts 5, 6 and 7 rotatable about the vertical axis 3.

Figure 5:
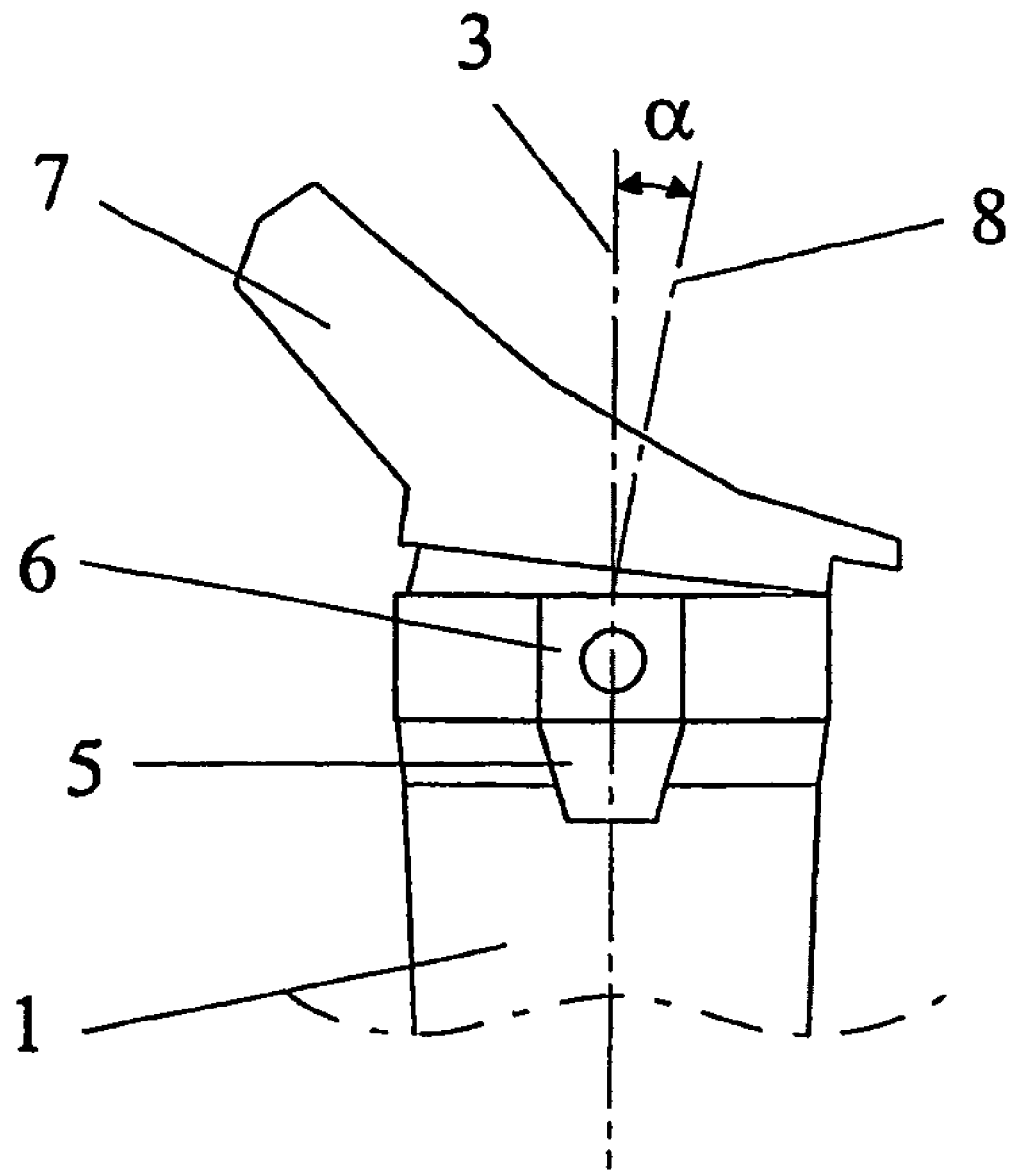
FIG. 5 shows the axis of rotation of the display part.

FIG. 5 illustrates how the axis of rotation 8 of the display part 7 has been deviated from the vertical axis 3 of the pipette, so that rotation of the display part allows simultaneous adjustment of the inclination of the display part according to the user's preferences. The angle α between the axis of rotation 3 and the vertical axis 8 is in the range 0-60°, preferably 0-50° and very advantageously 0-40°.

The drawings above illustrate but a number of preferred embodiments and do not by any means restrict the invention. The preferred embodiments of the invention may vary freely within the scope of protection defined by the accompanying claims.

The invention claimed is:

1. An electric pipette comprising a body having vertical and horizontal axes, a tip part for receiving and discharging a liquid, a hook part for stabilizing the pipette during use, a push-button part for actuating a piston for drawing liquid into and discharging liquid from the tip part, and a display part for monitoring a volume of liquid drawn into and/or discharged from the tip part, wherein the display part is rotatable about the horizontal axis of the pipette body so as to permit inclination thereof at an angle α relative to the vertical axis of the electric pipette body, and wherein the electric pipette includes at least two parts rotatable through angles $\phi_1$, $\phi_2$, and $\phi_3$ about the vertical axis of the electric pipette body, wherein the rotatable parts are selected from the group consisting of the hook part, the push button part, and the display part.

2. An electric pipette according to claim 1, wherein the at least two rotatable parts are rotatable 0-360° about the vertical axis of the electric pipette body.

3. An electric pipette according to claim 1, wherein at least one of the angles $\phi_1$, $\phi_2$ or $\phi_3$ is in the range −90-90°.

4. An electric pipette according to claim 1, wherein at least one of the angles $\phi_1$, $\phi_2$ or $\phi_3$ is in the range −70-70°.

5. An electric pipette according to claim 1, wherein at least one of the angles $\phi_1$, $\phi_2$ or $\phi_3$ is in the range −50-50°.

6. An electric pipette according to claim 2, wherein the display part is rotatable about a horizontal axis of the pipette body so as to permit inclination thereof at an angle α in the range 0-60° relative to the vertical axis of the electric pipette body.

7. An electric pipette according to claim 2, wherein the display part is rotatable about a horizontal axis of the pipette body so as to permit inclination thereof at an angle α in the range 0-50° relative to the vertical axis of the electric pipette body.

8. An electric pipette according to claim 2, wherein the display part display part is rotatable about a horizontal axis of the pipette body so as to permit inclination thereof at an angle α in the range 0-40° relative to the vertical axis of the electric pipette body.

9. An electric pipette according to claim 1, wherein each of the hook part, the push-button part and the display part is rotatable through angles $\phi_1$, $\phi_2$ and $\phi_3$, respectively, about the vertical axis of the electric pipette body.

10. An electric pipette according to claim 1, wherein each of the hook part, the push-button part and the display part is rotatable 0-360° about the vertical axis of the electric pipette body.

11. An electric pipette according to claim 9, wherein at least one of the angles $\phi_1$, $\phi_2$ or $\phi_3$ is in the range −90-90°.

12. An electric pipette according to claim 9, wherein at least one of the angles $\phi_1$, $\phi_2$ or $\phi_3$ is in the range −70-70°.

13. An electric pipette according to claim 9, wherein at least one of the angles $\phi_1$, $\phi_2$ or $\phi_3$ is in the range −50-50°.

14. An electric pipette according to claim 10, wherein the display part is rotatable about a horizontal axis of the pipette body so as to permit inclination thereof at an angle α in the range 0-60° relative to the vertical axis of the electric pipette body.

15. An electric pipette according to claim 10, wherein the display part is rotatable about a horizontal axis of the pipette body so as to permit inclination thereof at an angle α in the range 0-50° relative to the vertical axis of the electric pipette body.

16. An electric pipette according to claim 10, wherein the display part is rotatable about a horizontal axis of the pipette body so as to permit inclination thereof at an angle α in the range 0-40° relative to the vertical axis of the electric pipette body.

* * * * *